Feb. 28, 1933.  D. E. KEECH  1,899,337
CONVEYER CONTROL
Filed Jan. 28, 1930  2 Sheets-Sheet 1

Inventor:
Dana E. Keech

Feb. 28, 1933. D. E. KEECH 1,899,337
CONVEYER CONTROL
Filed Jan. 28, 1930 2 Sheets-Sheet 2
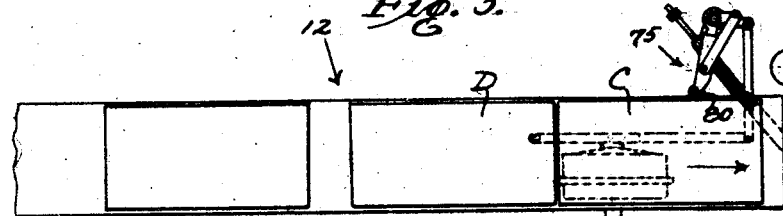
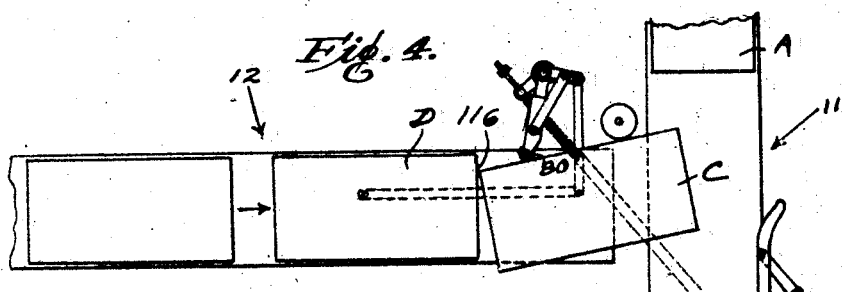
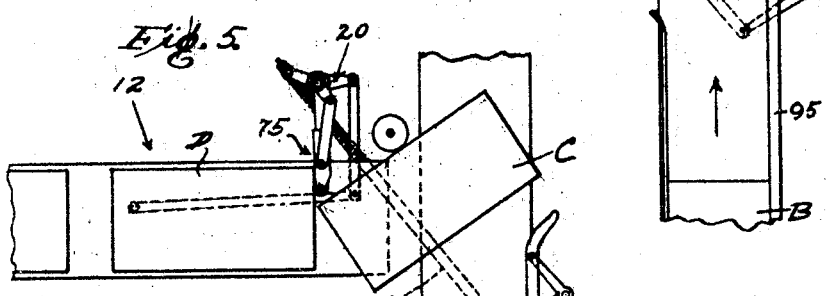
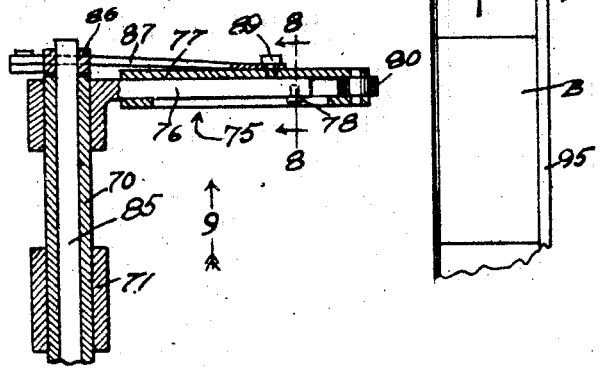
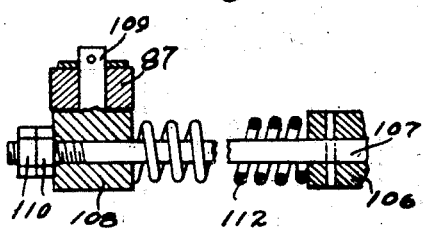
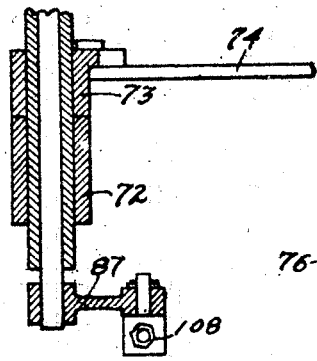
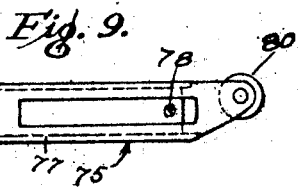
Inventor:
Dana E. Keech Patented Feb. 28, 1933

1,899,337

UNITED STATES PATENT OFFICE

DANA E. KEECH, OF GLENDALE, CALIFORNIA

CONVEYER CONTROL

Application filed January 28, 1930. Serial No. 424,085.

My invention relates to conveyer controls and particularly to such controls as are automatically operated by articles carried on the conveyer.

While my invention is adaptable to many different situations involving conveyers, the embodiment of it disclosed herein comprises an automatic conveyer intersection switch.

The general purpose of such switches is to prevent articles on a feeder conveyer from fouling those carried on a main conveyer onto which the feeder discharges. Switches are in general use for this purpose but they all fall short of satisfactorily accomplishing it. The principal difficulty seems to have been that under certain circumstances a box which it is desired to restrain from passing into the intersection will come to rest supported partly upon a dead conveyer and partly on a live one. Thus supported, the box may be dragged slowly onto the live conveyer just in time to be carried into the intersection and foul another box having the right of way.

In my copending application on a conveyer control filed herewith, I have disclosed a switch which cannot be made to jam in this manner. The switch disclosed herein also has this advantage. In the other switch, control of the feeder conveyer is accomplished by engagement of the control member with a front portion of an article on the feeder conveyer and this is facilitated by the fact that a preceding box is carried out of the way by the main conveyer. However, there are situations in which this expedient might not be used.

It is accordingly an object of this invention to provide other and novel facilities for utilizing movement of an article on a conveyer for controlling said conveyer.

In certain circumstances where control of a conveyer by an article thereon is required, the articles are disposed in single file one closely behind another on the conveyer. In order to bring a control member and a moving article into operative engagement I have found it necessary to displace an article from its normal path of travel on the conveyer.

It is accordingly a further object of my invention to provide means for moving a portion of an article from its normal path to facilitate such an operative engagement.

The manner of accomplishing the foregoing objects and advantages will be made manifest in the following description and in the accompanying drawings, in which:

Figs. 3, 4 and 5 are diagrammatic plan views similar to Fig. 1 and, taken in connection with that figure, illustrate the operation of the invention.

Fig. 6 is an enlarged fragmentary vertical sectional view taken on the line 6—6 of Fig. 1, illustrating a detail of the control member and positioning mechanism of my invention.

Fig. 7 is a fragmentary vertical sectional view taken on the line 7—7 of Fig. 1, illustrating another detail of said control member and positioning mechanism.

Fig. 8 is a vertical cross sectional detail view taken on the line 8—8 of Fig. 6.

Fig. 9 is a fragmentary bottom plan view of aforesaid control member and is taken in the direction of the arrow 9 in Fig. 6.

Figure 1:
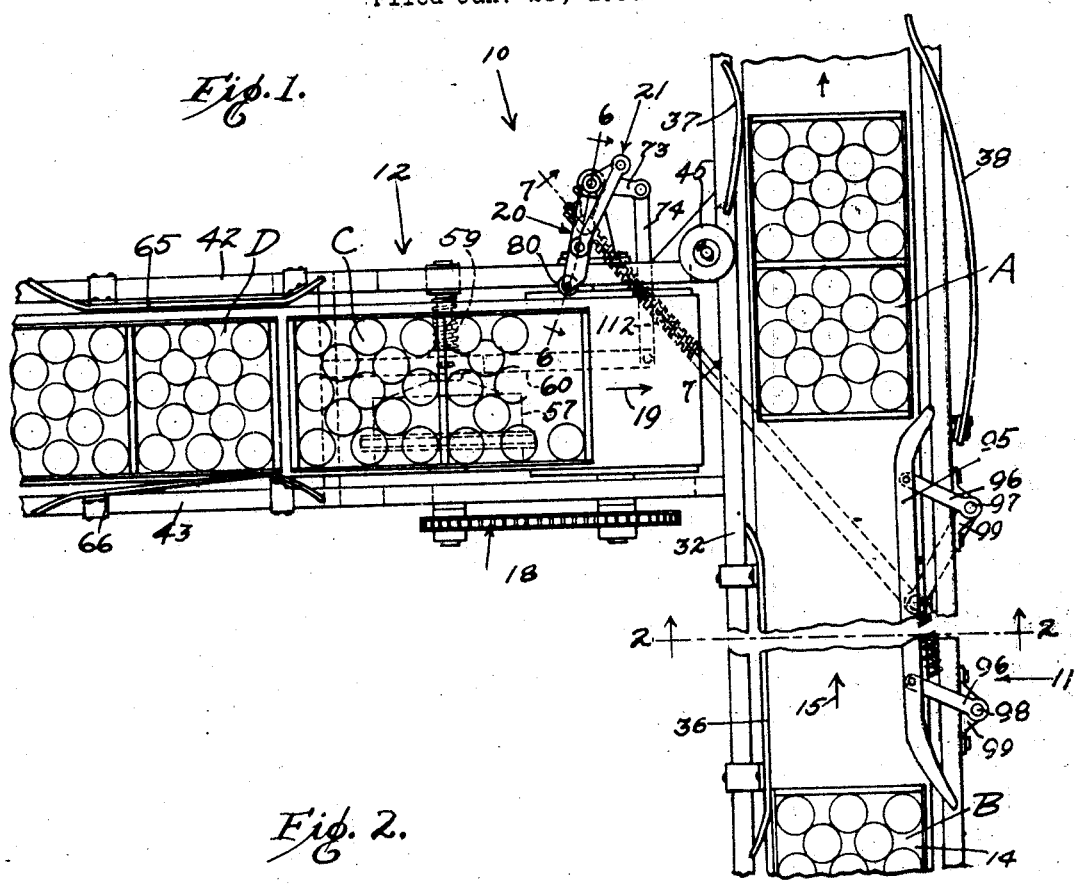
Fig. 1 is a plan view of a preferred embodiment of my invention.
Figure 2:
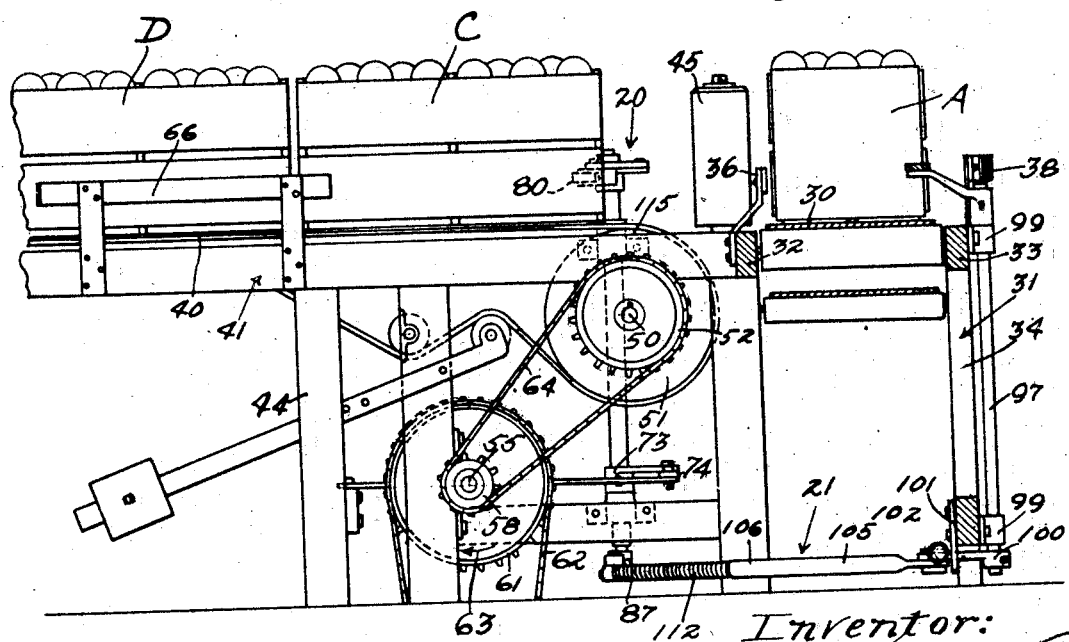
Fig. 2 is a vertical cross sectional view taken on the line 2—2 of Fig. 1.

Referring specifically to the drawings, the embodiment of my invention illustrated herein comprises an automatic conveyer intersection switch 10, which includes a primary conveyer 11 and a secondary conveyer 12. The primary conveyer 11 operates continually to convey articles, such as boxes of oranges 14, in the direction of the arrow 15. The secondary conveyer 12 is operated by a power transmission means 18 in the direction of the arrow 19 to deliver boxes 14 onto the primary conveyer 11. Interference of boxes, discharged from the secondary conveyer 12, with boxes passing through the intersection switch 10 on the primary conveyer 11 is prevented by a power transmission control member 20, the positioning of which, to prevent such interference, is accomplished by a control member positioning mechanism 21 which is actuated by boxes 14 approaching the intersection switch 10 on the primary conveyer 11.

The primary conveyer 11

The primary conveyer 11 is preferably formed of an ordinary conveyer belt 30 supported and continuously driven in the usual manner upon a frame 31, which includes longitudinal members 32 and 33 and posts 34. Provided upon longitudinal frame members 32 and 33 are fixed box guides 36, 37 and 38, the purpose of which will become evident further on in this description.

The secondary conveyer 12

The secondary conveyer 12 includes an ordinary conveyer belt 40 which is supported in the usual manner on a frame 41, which includes longitudinal members 42 and 43 and posts 44 supporting these. The longitudinal members 42 and 43 abut against and are secured to the longitudinal member 32. Supported in upright position on the members 32 and 42 at their juncture is a freely rotatable roller 45.

Journalled in suitable bearings attached to horizontal members 42 and 43 is a shaft 50 carrying a pulley drum 51 and a sprocket 52. The conveyer belt 40 extends around the drum 51 so as to be driven thereby in the direction of the arrow 19, when the drum 51 is in motion. Supported on a shaft 55 which journals in suitable bearings provided on the legs 44 is a clutch 57 and a pinion sprocket 58. Disposed about the shaft 55 and keeping the clutch 57 normally closed is a spring 59 which is adapted to be compressed by a clutch lever 60 which is fulcrumed at one end on the frame 41. The clutch 57 is adapted to be rotated by a ring sprocket 61 provided on the outer shell thereof and engaged by a chain 62. The chain 62 continuously rotates the ring sprocket 61 and outer shell of the clutch 57 in the direction of the arrow 63. The sprocket 58 is connected to the sprocket 52 by a chain 64 so that whenever the clutch 57 is thrown in, the belt 40 is placed in motion.

Transmission control member and positioning mechanism

The transmission control member 20 has a thimble shaft 70 which is vertically mounted in suitable bearings 71 and 72 which are secured to a frame 41 as shown. Secured upon a lower portion of the thimble shaft 70 is an arm 73, the hub of which rests upon the bearing 72 so as to support the shaft 70. The outer end of the arm 73 is connected by a link 74 to the free end of the clutch lever 60. Secured upon the upper end of the shaft 70 is an extensible contacting member 75 which includes an arm 76 upon which a shell 77 is slidably mounted as shown. Provided upon the arm 76 is a stop 78 which limits the outward movement of the shell 77. Rotatably mounted in a bifurcated end portion of the shell 77 is a roller 80.

The control member positioning mechanism 21 includes a shaft 85 extending throughout the length of the thimble shaft 70 and having an arm 86 secured to its upper end and an arm 87 to is lower end. The outer end of the arm 86 is pivotally connected to one end of a link 88, the other end of which is pivotally secured by a cap screw 89 to the shell 77 of the extensible member 75.

Also included in the positioning mechanism 21 is a swingably mounted box contacting bar 95 which pivotally connects outer ends of arms 96 provided on vertical shafts 97 and 98, which are rotatably supported in suitable bearings 99 secured to the frame 31. Secured upon the lower end of the shaft 97 is an arm 100 which is continually urged against a stop 101, provided on the frame 31, by a contractile spring 102. When the arm 100 is against the stop 101 the swingable bar 95 is in its inwardmost position as shown in Fig. 1, in which position it is adapted to be contacted by a box moving toward it on the primary conveyer 11 so as to swing this bar 95 into its outwardmost position in which it is shown in Figs. 3, 4 and 5.

Connecting the outer ends of the arm 100 and the arm 87 is a compressible link 105 which includes a rigid tube 106, one end of which is pivoted to the arm 100. At the opposite end of the arm 100 is provided a rod 107, the outer end of which is threaded and extends through a slide block 108, a stud 109 of which extends through and pivots in the outer end of the arm 87. Screwed upon the end of the rod 107 are a pair of lock nuts 110 which prevent the withdrawal of this rod from the block 108. Disposed between the block 108 and the adjacent end of the tube 106 is a compression spring 112 which yieldably maintains these in spaced relation. Provided on suitable supports on the longitudinal members 42 and 43 are box guides 65 and 66, the purpose of which will be made evident later.

Operation

Boxes 14 are shown traveling on the primary and secondary conveyers 11 and 12 respectively in Figs. 1, 3, 4 and 5, in a succession of positions which illustrate how the intersection 10 works to prevent boxes discharged from the secondary conveyer 12 from interfering with boxes traveling on the primary conveyer 11. For convenience, the boxes 14 will be identified as boxes A, B, C and D. In Fig. 1, box A is just passing the point of juncture between conveyers 11 and 12 and has just passed out of contact with the swinging bar 95 permitting this to swing into the position in which it is shown in Fig. 1. Box B is following box A on the conveyer 11 and is just approaching contact with the swinging bar 95. Boxes C and D are traveling on the conveyer 12 in close succession, the front end portion of box C having just traveled past the extensible arm 75 of the transmission control member 20.

Fig. 3 shows box A further advanced away from the point of juncture between the conveyers 11 and 12; box B in contact with the swinging bar 95 so as to compress the compressible link 105, causing the rod 107 to be shoved through the slide block 108 and compressing the spring 112 against this block. This places the shaft 85 under torque, tending to swing the arm 86 and thrust the shell 77 of the extensible arm 75 across the path of movement of boxes C and D. This causes the contact roller 80 to be forced against the side of box C as shown in Fig. 3 at a point to the rear of the highest point 115 of the drum 51 where the upper flight of the belt 40 begins to bend around this drum.

The significance of applying a pressure against box C by the roller 80 in this manner is illustrated in Fig. 4. Here, box A has drawn entirely away from the point of juncture of the conveyers 11 and 12, box B is still some distance from arriving at this point of juncture, and the center of gravity of box C has just passed over the high point 115 of the drum 51 with the result that the pressure of the roller 80 against the rear portion of this box shifts this portion of box C laterally so that the front portion 116 of box D is uncovered. Thus the roller 80 is enabled to be positioned by the positioning mechanism 21 so that it comes into contact with box D and is carried by the latter under the propulsion of the secondary conveyer 12 so as to rotate the thimble shaft 70, thus swinging the clutch control lever 60 and throwing out the clutch 57, which causes motion of the conveyer 12 to be discontinued. As shown in Fig. 5, the swinging bar 95 is of ample length to prevent box B from arriving at the point of juncture between the conveyers 11 and 12 before box C is completely transferred onto the conveyer 11.

When box B has travelled into the position in which box A is seen in Fig. 1 the swinging bar 95 is released to swing back, under the urging of the spring 102, into the position in which it is shown in Fig. 1, which causes all parts of the control member positioning mechanism 21 to resume their positions as shown in Fig. 1. This results in the retraction of the extensible member 75, withdrawing the roller 80 out of contact with box B, thus permitting the shaft 70 to be rotated under the pressure of the spring 59 to its normal position whereby the clutch 57 is thrown in, thus reconnecting the power transmission through which the secondary conveyer 12 is driven. At the instant the secondary conveyer 12 is thus placed in motion, box D is in the same position as box C in Fig. 1, and box B is in the same position as box A, with the result that the interference between boxes B and D is avoided at the intersection in the same manner that the interference was avoided by the boxes A and C. The conditions illustrated in the drawings are what might be known as limit conditions, in other words, conditions which are most likely to cause interference at the intersection, embodying my invention, is impossible.

I regard as one of the distinctive features of my invention the shifting of an article carried on a conveyer so as to facilitate the engagement of an article propelled by this conveyer with control means for controlling movement of this conveyer or preventing interference of this article with articles carried on another conveyer onto which the first conveyer discharges.

While I have shown but a single embodiment of my invention it is to be understood that various modifications may be made in the structure and operation without departing from the spirit of the invention or the scope of the following claims.

What I claim is:

1. In combination: a power driven conveyer adapted to carry boxes; a control for stopping and starting said conveyer, said control being actuated to stop said conveyer when moved in the direction in which this conveyer travels; and means for moving said control across the path of travel of boxes on said conveyer to displace a leading box from in front of a following box and permit the latter to actuate said control to stop said conveyer.

2. A combination as in claim 1 including means for withdrawing said control from in front of said box, said control starting said conveyer when so withdrawn and while still opposite said box.

3. In combination: a power driven conveyer adapted to carry boxes; a control member adapted to be engaged by a box and moved in the direction of travel of said conveyer to accomplish a control function; and means for shifting said member across said direction of travel to displace a leading box from in front of a following box and permit the latter to actuate said control member.

4. In combination: a primary power conveyer; a secondary power conveyer making a substantially direct rectangular intersection therewith; a control member located near said intersection and adapted to be engaged by a box on one of said conveyers and moved in the direction of travel of said conveyer to accomplish the control function; and means for shifting said member across said direction of travel to displace a leading box on said conveyer from in front of a following box and permit the latter to actuate said control member, the displacing of said leading box tending to assist this in turning at said intersection onto the other of said conveyers.

5. A combination as in claim 3 in which said control member is shifted across the direction of travel of the conveyer with a yieldable pressure.

In testimony whereof, I have hereunto set my hand at Los Angeles, California, this 3rd day of January, 1930.

DANA E. KEECH.